UNITED STATES PATENT OFFICE.

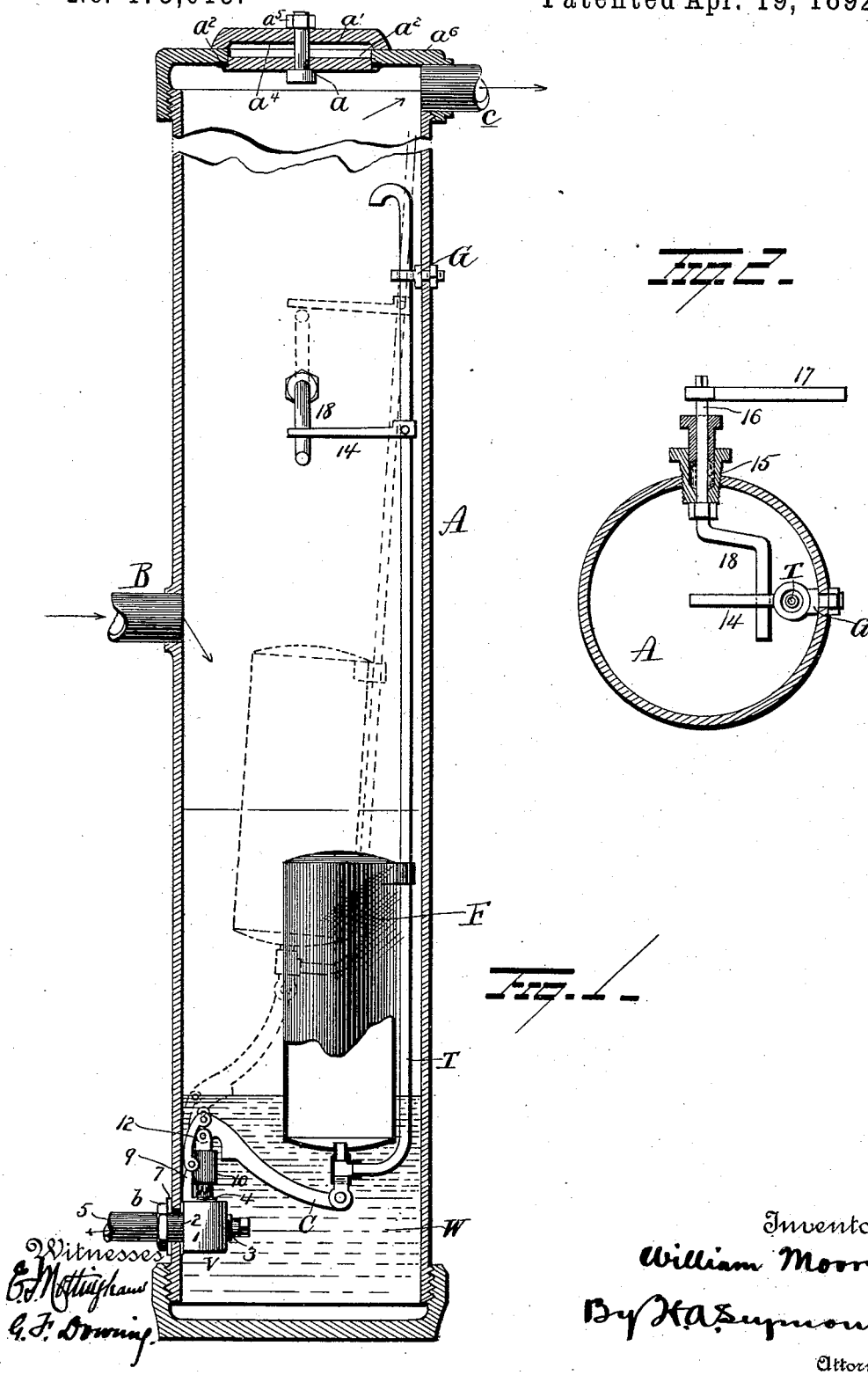

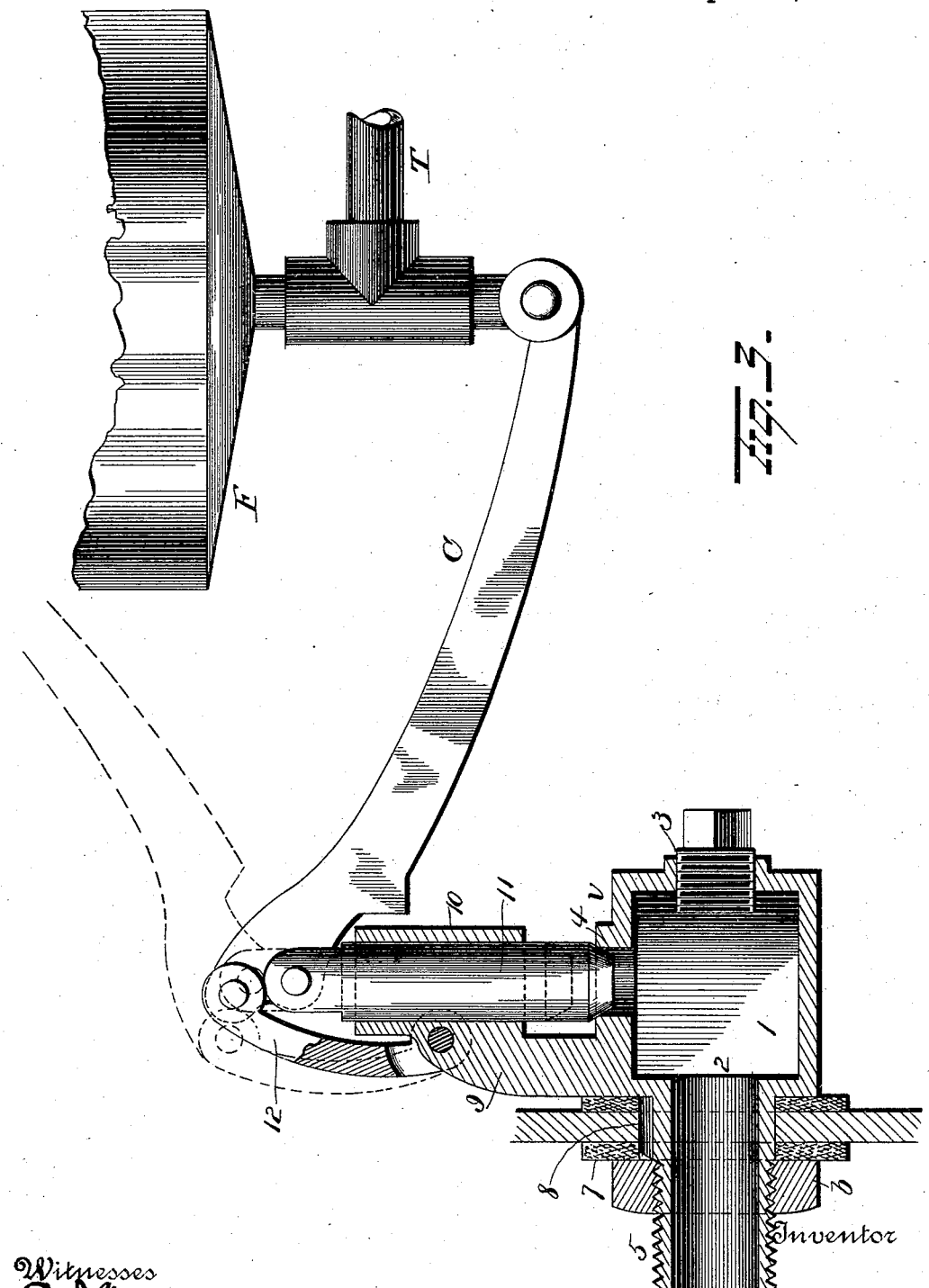

WILLIAM MOORE, OF KOKOMO, INDIANA.

APPARATUS FOR SEPARATING NATURAL GAS FROM OIL, WATER, &c.

SPECIFICATION forming part of Letters Patent No. 473,013, dated April 19, 1892.

Application filed October 21, 1891. Serial No. 409,395. (No model.)

*To all whom it may concern:*

Be it known that I, WILLIAM MOORE, a citizen of Kokomo, in the county of Howard and State of Indiana, have invented certain new and useful Improvements in Apparatus for Separating Natural Gas from Oil, Water, &c.; and I do hereby declare the following to be a full, clear, and exact description of the invention, such as will enable others skilled in the art to which it appertains to make and use the same.

My invention relates to an improvement in apparatus for separating natural gas as it comes from the well from oil, water, &c., which escape with it. Throughout some portions of the natural-gas regions about nine hundred feet are drilled into what is called "Trenton limestone," which in the gas region is an open porous rock and constitutes the reservoir in which the gas is held under a pressure of three hundred and twenty pounds to the square inch. The lower portions of this porous rock are filled with salt-water and in some localities with oil. Now this gas in some places is in a limited stored quantity, which is fast becoming exhausted. The salt-water or oil follows it up, which sooner or later comes in with the gas and fills up the lines, causing great danger in using it. Many lives and much property have been destroyed from this cause. The way the accidents occur is: The water accumulating in the lines will make a dash into the furnaces under steam-boilers and other places, putting out the fires. Then the gas following again into a hot furnace is almost sure to ignite again, with an explosion, tearing everything to atoms, sometimes lifting the boilers from their settings. Hence it will be seen that it is important to provide some reliable effective means to preclude these disastrous results.

In practice it has been found that the most difficult feature to be remedied is the production of a reliable float that will stand the enormous pressure of natural gas without collapsing and still be light enough to float with sufficient buoyancy to operate a valve. It is the object of my present invention to obviate this difficulty and to construct an apparatus by means of which the gas will be effectually separated from foreign matters, such as water, oil, mud, &c.

A further object is to produce an apparatus which will operate to automatically separate natural gas from foreign elements under all conditions of the wells and any pressure or force which the gas may exert.

With these objects in view the invention consists in certain novel features of construction and combinations and arrangements of parts, as hereinafter set forth, and pointed out in the claims.

In the accompanying drawings, Figure 1 is a vertical sectional view of the apparatus. Fig. 2 is a sectional view. Fig. 3 is a detail view of the outlet-valve.

A represents a tube or reservoir of gas or other pipe at or near a gas-well of any suitable size or shape for receiving the gas, water, or oil as it comes from the well through the pipe B, which communicates with the pipe or reservoir A at a point removed some distance from the top of said pipe or reservoir, the water or oil by its greater specific gravity going to the bottom. The gas by its extreme lightness passes to the top of the vessel and out through a pipe $c$ to the line. The top of the reservoir is provided with a removable head, in the center of which an opening is made, whereby access may be had to the interior of the pipe or reservoir A to insert, remove, or adjust the devices contained in said reservoir. The opening is covered by a cap-plate $a'$, between which and the head $a^6$ a washer $a^2$ is inserted. A headed bolt $a$ passes through the cap-plate $a'$ and through a yoke $a^4$ on top of the head $a^6$, and is provided on its upper end with a nut $a^5$. Gas being fourteen hundred and fifty-five times lighter than water at atmospheric pressure it is left free from all those heavy impurities which come with the gas from the well, more or less combined with mud, sand, &c., which latter will be discharged through a valve $v$ at the bottom of the pipe or reservoir A, the valve $v$ being worked automatically by means of a float F, through the medium of a link or lever C. The body 1 of valve $v$ is made with an outlet 2 and a plugged opening 3 in opposite sides and a valve seat or opening 4. A hollow shank 5 communicates with the opening or outlet 2 and extends through the wall of the pipe or reservoir A, said stem being screw-threaded for the reception of a nut $b$, a washer 7 being inserted between said nut and the pipe or reservoir and held in place by a rib 8. Projecting upwardly from the body 1 of the valve is a bracket 9, which carries a vertical sleeve 10, and passing loosely through this sleeve is a valve-stem 11, having a conical lower end adapted to be seated on the seat or opening 4 and close the same. The upper end of the stem 11 is pivotally connected to the lever C, the other end of which lever is connected with the float F, as previously explained. Pivotally connected to the lever C, just above its pivotal connection with the stem 11, is the bifurcated upper end of a link 12. The lower end of the link 12 is also bifurcated and pivotally connected to the bracket 9. By this construction the float F will be enabled to exert a powerful action in lifting the valve-stem 11, and just as soon as the tight set of the valve is broken an increased movement of the stem 11 will be had to make a large outlet for the water, &c.

The float is made of sheet metal or other material, made perfectly gas-tight so that no gas can enter into it except at the bottom through the bent tube T, which extends high up into the gas-chamber, preferably being bent and open at the upper end so that the gas will enter and pass down through the tube into the float F until the pressure of the gas in the vessel A and the interior of the float F become equalized. The tube T passes loosely through a bracket G, which holds it in position. As the water W rises, the float is buoyed up and opens the valve v until the water or oil is forced out. Then the float recedes, closing the valve again and always holding a water seal above the valve.

My invention is applicable only to cold gases or to such only as do not condense into a liquid by any change of temperature or such as retain their identity and expansive action at all temperatures and pressures. Natural gas coming from a well through the pipe B into the reservoir A comes in with such terrific force that the water or oil is blown into a very fine mist, (much like a heavy fog,) which is held in suspension with the gas under the varying pressures of the gas held in the vessel A and also in the float F. Now, under the well-known Mariotte law of the elasticity and expansion of gases, there is a continual passing in and out of the gas through the tube T into the float F. Now when the gas is in the vessel A, holding this moisture by the violent commotion in passing through the vessel or reservoir A to the outlet c, a portion of it passes into the tube T, and this gas, as soon as it enters the float F, is then in a state of rest. There, while in this quiescent state, a perfect separation takes place by the action of gravitation. The water or oil falls to the bottom in a liquid form and would in time fill the float with liquid, destroying its action for the purpose designed.

The practical working of gas-wells brings another action into play, which precludes the filling up of the float. Three hundred and twenty pounds is the highest natural pressure we have in most gas-fields. A number of wells are drilled and connected to a main line, which leads to the consumers at varying distances from the wells. The consumption is variable, according to the weather, and when the consumption is light the pressure runs up in the lines, separators, and wells almost to "rock pressure." Then, again, when the consumption is heavy pressures run down to perhaps not more than twenty-five or thirty pounds, so that the benefit of the expansive action of the gas to discharge the water or oil from the float up through the tube T will be readily seen, and therefore the novelty of my construction will be readily perceived. The float being a perfectly air-tight vessel, except at the bottom, with the tube extending high up into the reservoir A and under the varying pressures of the gas, it becomes a sort of breathing organ, expelling everything in a liquid form from it, thereby precluding any liability of it getting filled, so as to lose its buoyancy and being rendered inefficient for the purpose for which it is designed.

It will be seen that the apparatus operates automatically; but occasion might arise when it would be desired to operate the valve manually; and to provide for this contingency I have provided means whereby this may be accomplished, which devices are described as follows: An arm 14 is secured to and projects from the tube T. A bell-crank lever 18 projects through a stuffing-box 15, located in the wall of the reservoir A, said bell-crank lever terminating beyond the exterior of the reservoir in a shank 16, to which a crank or handle 17 is attached, by means of which to operate said lever. The inner end of the bell-crank lever terminates at a point somewhat below the arm 14, so as not to interfere with the proper automatic operation of the tube T and attached float F.

Having fully described my invention, what I claim as new, and desire to secure by Letters Patent, is—

1. In a gas apparatus, the combination, with a chamber or reservoir and gas inlet and outlet, of a hollow air-tight float and a tube communicating with the bottom of said float and extending a distance upwardly within the chamber or reservoir, substantially as set forth.

2. In a gas apparatus, the combination, with a chamber or reservoir and gas inlet and outlet, of a hollow air-tight float, a tube communicating with the bottom of said float and extending a distance upwardly within the chamber or reservoir water-outlet, and an outlet-valve connected with said float, substantially as set forth.

3. In a gas apparatus, the combination, with a chamber or reservoir, an inlet constructed to discharge natural gas and foreign matter into the chamber or reservoir at a point between its ends, and a gas-outlet at the upper part of the chamber or reservoir, of a hollow air-tight float within said chamber or reservoir, a tube communicating with the bottom of said float and extending some distance upwardly within the chamber or reservoir, an outlet for the chamber or reservoir, and a valve for said outlet connected with and controlled by said float, substantially as set forth.

4. In a gas apparatus, the combination, with a reservoir and a float located therein, of an outlet-valve, a lever connecting said float with the stem of said valve, and a pivoted link pivotally connected to said lever at a point in proximity to the pivotal connection of said lever with its valve-stem, whereby a compound leverage is effected in the operation of the valve of the float, substantially as set forth.

5. The combination, with a gas-reservoir, of an outlet-valve, said outlet-valve comprising a body portion having a valve-seat, a bracket projecting from said valve-seat, a sleeve carried by said bracket, a valve-stem constructed to pass loosely through the valve-sleeve and constructed to rest on the valve-seat and normally close the opening therein, and a link pivoted at one end to said bracket and at the other end to a lever, which latter is pivotally connected to the valve-stem at a point in proximity to the pivotal connection of the valve with the link, substantially as set forth.

6. In a gas apparatus, the combination, with a reservoir, of a float therein, a tube communicating with said float and extending above the top of the float, an outlet-valve connected with said float, an arm connected with said tube, a bell-crank lever passing through a stuffing-box in the wall of the reservoir and terminating within the reservoir at a point below the arm on the tube, and a handle on the outer end of said bell-crank lever, substantially as set forth.

In testimony whereof I have signed this specification in the presence of two subscribing witnesses.

WILLIAM MOORE.

Witnesses:
  JOHN E. MOORE,
  W. W. PEARCE.